United States Patent [19]

Freeman

[11] 4,395,174

[45] Jul. 26, 1983

[54] SELF-PENETRATING FASTENER FOR FASTENING ROOFING PANELS TO METAL BEAMS

[76] Inventor: James D. Freeman, 11 W. Grand Ct., Springfield, Ill. 62704

[21] Appl. No.: 264,453

[22] Filed: May 18, 1981

[51] Int. Cl.³ .............................................. F16B 15/06
[52] U.S. Cl. ................................... 411/510; 411/387; 411/74
[58] Field of Search ............... 403/408; 411/510, 509, 411/508, 514, 72, 73, 387, 156, 544, 456, 74; 52/543, 521, 478, 483

[56] References Cited

U.S. PATENT DOCUMENTS

| | | | |
|---|---|---|---|
| 2,650,516 | 9/1953 | Poupitch | 411/508 |
| 4,003,175 | 1/1977 | Patry | 411/456 |
| 4,241,639 | 12/1980 | Baer | 411/387 |
| 4,261,243 | 4/1981 | Palmer | 411/510 |

FOREIGN PATENT DOCUMENTS 2026083  1/1980  United Kingdom ............... 403/408

*Primary Examiner*—John E. Murtagh
*Assistant Examiner*—Michael Safavi
*Attorney, Agent, or Firm*—Ralph F. Staubly

[57] ABSTRACT

A fastener for anchoring a sheet-metal roofing panel to the top horizontal web of a roof-supporting sheet-metal beam, comprises a headed shank having an enlarged tip end constructed to penetrate said roofing panel and the underlying web of the panel's supporting beam, by being either percussively driven or rotatingly bored therethrough. In one species, an elastic plastic sleeve, which embraces the shank, has (1) a series of molded rings forming stepped seats engageable under the penetrated beam web and (2) a dome-shaped capping flange resiliently engageable down against the upper surface of the roofing panel. In a second species, a metallic sleeve, split for expanded slip-over engagement with the shank of the fastener, has vertical rows of struck-out anchoring fingers; and a resilient dome-shaped member is resiliently squeezed between the head of the fastener and the upper surface of the roofing panel. Said member may include a bowed spring-steel cross-shaped element.

9 Claims, 7 Drawing Figures

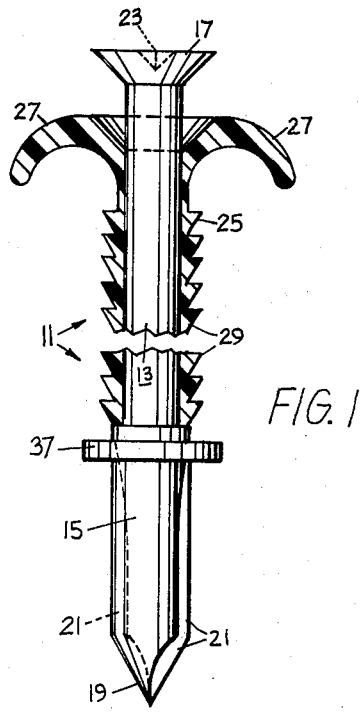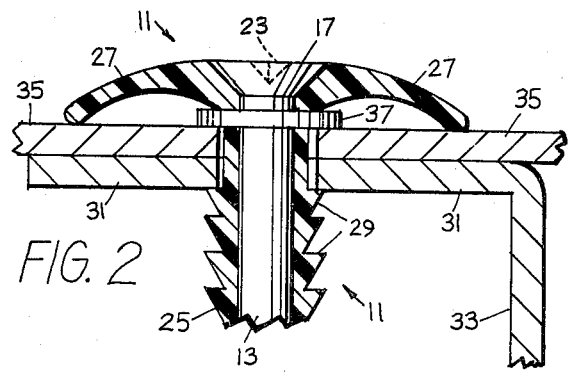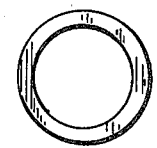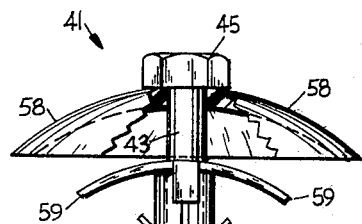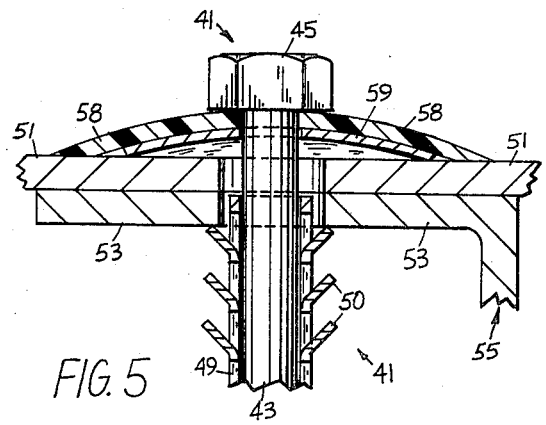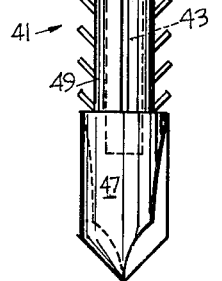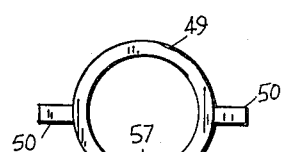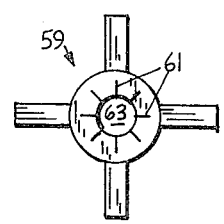

SELF-PENETRATING FASTENER FOR FASTENING ROOFING PANELS TO METAL BEAMS

BACKGROUND AND OBJECTS OF THE INVENTION

It is known to fasten sheets or panels to supporting sheets or panels by percussively driven nail-like elements having barb-like projections thereon, for examples, U.S. Pat. Nos. 2,868,057 to Anstett, 3,882,755 to Enstrom and 4,003,175 to Patry. But there is not known a fastener of this type wherein the shaft portion between an enlarged head and an enlarged metal-penetrating tip is jacketed by a sleeve having resiliently expandable barb-like anchoring projections, wherein a resilient arch-shaped fastener-tensioning and water-excluding gasket underlies said head, and wherein said tip is designed for percussive or rotational penetration. It is accordingly the principal object of this invention to provide such a fastener. Other objects and advantages will appear hereinafter.

BRIEF DESCRIPTIONS OF THE DRAWING FIGURES

FIG. 1 is an elevational view, partly in axial section, of a preferred embodiment of the invention.

FIG. 2 is an enlarged fragmentary view of the upper half of the disclosure of FIG. 1 shown installed.

FIG. 3 is a plan view of the barb-protecting and cap-re-inforcing ring of FIGS. 1 and 2.

FIG. 4 is an elevational view (partly broken-away) of a second species of the invention.

FIG. 5 is an enlarged fragmentary view of the upper third of FIG. 4 in axial section and shown installed.

FIG. 6 is an enlarged plan view of the split clip-on resilient-fingered sleeve of FIG. 4.

FIG. 7 is a plan view of the dome-shaped "spider" spring of FIGS. 4 and 5.

DETAILED DESCRIPTION

With reference now to FIGS. 1-3, the numeral 11 generally designates a fastener which comprises basically a cylindrical metallic shank 13 having an enlarged tip 15 and an enlarged head 17. The tip 15 has a pointed end 19 to facilitate percussive penetration, and has sharp-edged reamer-type depressions 21 to facilitate rotational penetration, which can be effected by a rotated shaft engageable in a Phillips-type socket 23 in the head 17.

A plastic sleeve 25 is sufficiently elastic to be stretched to be slid over the tip 15. The sleeve 25 has an integral downwardly curved top flange 27 and a series of axially spaced molded-on resilient steps 29 which define barb-like protuberances for engagement under the rim of an aperture formed by the head 17. In FIG. 2 the uppermost step 29 of the sleeve 25 is shown engaging the rim of an aperture cut in the horizontal web 31 of a sheet-metal beam 33 to which a roofing sheet 35 is fastened by the fastener 11.

A metallic or stiff-plastic ring 37 (FIGS. 1-3) is desirably placed on the tip 15 (as shown in FIG. 1) so that it will protectively slide up over the steps 29 as the tip 15 penetrates the roofing sheet 35 and the supporting beam web 31, to end up re-inforcing the top flange 27 of the sleeve 25. The flange 27 is sufficiently strongly springy to exert enough force to hold the roofing sheet 35 firmly against the web 31 of the beam 33. The steps 29 are also sufficiently stiff to assist the fastening action.

In FIGS. 4-7, the numeral 41 generally designates the second species of the fastener, which comprises basically a shaft 43 having a hexagonal head 45 and a penetrating tip 47 similar to the tip 15. A sleeve 49 made of spring-metal has struck-out fingers 50 for engagement under the rim of the aperture formed in the roofing sheet 51 and the web 53 of the beam 55 (FIG. 5). The sleeve 49 is longitudinally slit at 57 so as to be capable of being spread open for placement around the shaft 43.

A stiffly flexible water-excluding rubber or plastic gasket 58 is sufficiently elastic to be stretched over the tip 47 before the sleeve 49 is placed. A bowed spring-metal spider 59 (FIG. 7) is desirably employed to re-inforce the gasket 58. The spider 59 has radial slits 61 which permit its shaft-embracing aperture 63 to expand in sliding over the tip 47 during assemblage.

The invention having been described, what is claimed is:

1. A self-penetrating fastener for attaching a sheet-material panel to a plate-like support, comprising: a relatively rigid shaft having an enlarged head and an enlarged hole-forming tip; a sleeve closely surrounding the portion of said shaft between said head and said tip and having axially spaced resilient barb-like projections sized to squeeze through an aperture formed by said tip and to expand beyond the rim of the exit end of said aperture, so as to fasten said panel to said plate-like support by gripping them between said head and expanded portions of said projections; and a bowed spring-material thin spider-like wafer positioned to be compressed between said head and the top surface of said panel.

2. A fastener according to claim 1 wherein said tip is pointed so as to be percussively drivable.

3. A fastener according to claim 2 wherein said tip has formed therein sharp-edged reamer-type depressions to facilitate rotatable penetration.

4. A fastener according to claim 1 wherein said sleeve is formed of material sufficiently elastic to be stretchable over said tip during assemblage of said fastener.

5. A fastener according to claim 1 wherein said sleeve has an arch-shaped flange at its upper end to resiliently press said panel against said plate-like support and to seal said aperture against leakage of water thereinto.

6. A fastener according to claim 5 and additionally comprising a non-elastic ring having an inside diameter slightly greater than that of said tip so as (1) to protect said projections as said fastener passes through said aperture and (2) to re-inforce said arch-shaped flange when said fastener is fully inserted.

7. A fastener according to claim 1 wherein said sleeve is formed of spring metal and is longitudinally split to facilitate its placement around said shaft, and wherein said projections are stuck-out fingers.

8. A fastener according to claim 1 wherein a stiffly flexible arch-shaped plastic cap overlies said wafer and also seals said aperture against leakage of water thereinto.

9. A fastener according to claim 1 wherein a stiffly flexible arch-shaped water-excluding plastic cap underlies said head for resiliently pressing said panel against said plate-like support.

* * * * *